(12) United States Patent
McBrearty et al.

(10) Patent No.: US 6,651,091 B1
(45) Date of Patent: *Nov. 18, 2003

(54) SYSTEM FOR PRECLUDING REPETITIVE ACCESSING OF WEB PAGES IN A SEQUENCE OF LINKED WEB PAGES ACCESSED FROM THE WORLD WIDE WEB THROUGH SEARCHING

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,249

(22) Filed: Dec. 2, 1999

(51) Int. Cl.$^7$ .................................. B06F 15/16
(52) U.S. Cl. ................. 709/219; 709/200; 709/201; 709/202; 709/203; 709/217; 709/218; 709/219
(58) Field of Search ................. 709/217, 218, 709/219, 224, 200, 201, 203, 202; 707/100–102, 2, 3, 5, 500

(56) References Cited

U.S. PATENT DOCUMENTS 6,336,117 B1 * 1/2002 Massarani .................... 707/100
6,338,075 B2 * 1/2002 Fukuda ......................... 345/760

* cited by examiner

Primary Examiner—Glenton B. Burgess
Assistant Examiner—Mareisha N. Winters
(74) Attorney, Agent, or Firm—J. B. Kraft; Thomas E. Tyson

(57) ABSTRACT

In a searching or browsing session for Web pages on the World Wide Web (Web), a system for precluding repetitive accessing of documents linked to hyperlinks in a plurality of hypertext documents is presented. The system is directed to a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document. The system includes user interactive means for discounting hyperlinks in received Web documents and means for keeping track of each discounted hyperlink in each received or accessed document. The system further includes means for precluding the accessing of any document linked to a previously discounted hyperlink.

30 Claims, 4 Drawing Sheets

SYSTEM FOR PRECLUDING REPETITIVE ACCESSING OF WEB PAGES IN A SEQUENCE OF LINKED WEB PAGES ACCESSED FROM THE WORLD WIDE WEB THROUGH SEARCHING

CROSS-REFERENCE TO RELATED COPENDING PATENT APPLICATIONS

The following patent application assigned to the assignee of the present invention and filed concurrently herewith, covers subject matter related to the subject matter of the present invention: A SYSTEM FOR PRECLUDING REPETITIVE ACCESSING OF WEB PAGES IN A SEQUENCE OF LINKED WEB PAGES ACCESSED FROM THE WORLD WIDE WEB THROUGH A WEB BROWSER AT A WEB RECEIVING DISPLAY STATION, McBrearty et al., U.S. patent application Ser. No. 09/453,250, filed on the same day as the present application.

TECHNICAL FIELD

The present invention relates to computer managed communication networks such as the World Wide Web (Web) and, particularly, to systems, processes and programs for reducing users' time spent in searching by reducing the accessing of previously viewed documents.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct hyperlinks between Web pages embedded in such Web pages. This even further exploded the use of the Internet or Web. It was now possible for the Web browser or wanderer to spend literally hours going through document after document in often less than productive excursions through the Web. These excursions often strained the users' time and resources. A significant source of this drain can be found in the Web page itself (the basic document page of the Web).

In the case of Web pages, we do not have the situation of a relatively small group of professional designers working out the human factors; rather, in the era of the Web, anyone and everyone can design a Web page. As a result, Web pages are frequently set up and designed in an eclectic manner. Often Web pages are set up through loose business, professional, social and educational configurations with general trade or public input of Web pages. The names or identifiers selected for the hyperlinks by Web page hosts or authors are often very similar to each other. As a result, the user going through one or a series of Web searches or browses will find it virtually impossible to recognize the identifiers for hyperlinks to pages which have already been accessed through previous Web pages. Thus, the user may spend considerable time going around in circles.

SUMMARY OF THE PRESENT INVENTION

The present invention provides a simple and effective system through which the Web user may avoid the repetitive accessing of most of the previously accessed Web documents in a single, or a sequence of, Web searches.

The present invention is implemented in a communication network such as the Web or Internet (used synonymously) with user access via a plurality of data processor controlled interactive display stations for displaying received hypertext documents (Web pages) of at least one display page containing text, images and a plurality of embedded hyperlinks; each hyperlink being user selectable to access and display a respective linked hypertext document (Web page). It provides a system for precluding repetitive accessing of documents linked to hyperlinks in a plurality of hypertext documents. The basic system comprises conventional means at a Web page receiving display station for activating hyperlinks to linked documents in combination with means responsive to such activating means for accessing said linked documents. Means are provided for keeping track of each activated hyperlink in each received or accessed document together with means for precluding the accessing of any document linked to a previously activated or "discounted" hyperlink. A hyperlink is considered to be discounted if it has been in a previous Web page in the sequence and already been activated to access a linked document. Alternately, a hyperlink or a group of such hyperlinks have been in a previous document in the sequence and the user has decided that he had no interest and, thus, made an appropriate interactive entry to discount the hyperlinks.

The user may set up the system to operate on a single Web search or a sequence of such searches or sessions. Once a hyperlink is activated or discounted in a tracked Web page, the setup precludes the accessing of documents linked to previously activated or discounted hyperlinks contained in subsequently accessed documents. When the previously discounted or activated hyperlinks are part of the text or image content of said subsequently accessed document, then accessing of linked documents is precluded by rendering the previously activated hyperlinks inactivatable in the subsequently accessed documents without affecting the text or image value of said hyperlinks. If it turns out that any subsequently accessed Web pages or documents contain only previously discounted or accessed hyperlinks, then the system may not access such pages or documents.

The system for precluding may be in the Web search engine or in the Web browser associated with any particular Web display station. Where the precluding system is in the Web search engine, then the means for keeping track and the means for precluding the accessing of documents linked to previously accessed hyperlinks and for precluding said subsequent documents having only precluded hyperlinks are in said search engine.

The above cross-referenced copending application, A SYSTEM FOR PRECLUDING REPETITIVE ACCESSING OF WEB PAGES IN A SEQUENCE OF LINKED WEB PAGES ACCESSED FROM THE WORLD WIDE WEB THROUGH A WEB BROWSER AT A WEB RECEIVING DISPLAY STATION, is directed to the particular advantages of precluding the repetitive access of linked Web pages using a Web browsing system method and program.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
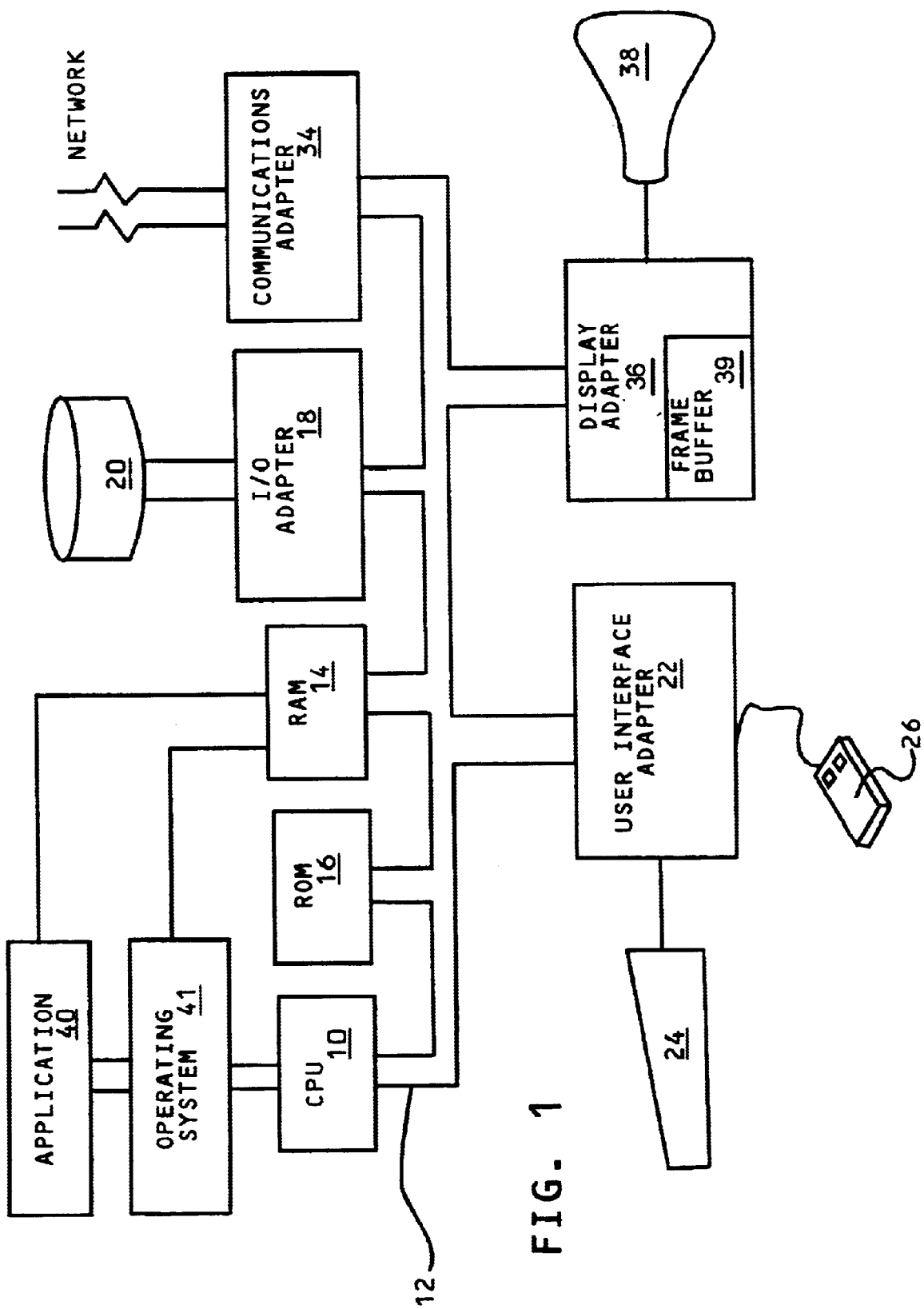
FIG. 1 is a block diagram of a data processing system including a central processing unit and network connections via a communications adapter which is capable of functioning as a user interactive Web station for receiving and transmitting Web pages.

Referring to FIG. 1, a typical data processing terminal is shown which may function as the computer controlled network terminal or Web display station used for receiving Web pages, for requesting Web searches and for Web browsing.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000(™) operating system available from IBM; Microsoft's Windows 98(™) or Windows NT(™), as well as UNIX and AIX operating systems. Application programs 40, controlled by the system, are moved into and out of the main memory random access memory (RAM) 14. These programs include the programs of the present invention for the precluding of repetitive accessing of Web documents to be subsequently described in combination with any conventional Web browser, such as the Netscape Navigator 3.0™ or Microsoft's Internet Explorer™. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web pages transmitted over global networks such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, Internet: *The Complete Reference, Millennium Edition*, Margaret Young et al., Osborne/McGraw-Hill, Berkeley, Calif., 1999.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. Web documents are conventionally implemented in HTML language, which is described in detail in the text entitled *Just Java,* van der Linden, 1997, SunSoft Press, particularly at Chapter 7, pp. 249–268, dealing with the handling of Web pages; and also in the above-referenced *Mastering the Internet,* particularly pp. 637–642, on HTML in the formation of Web pages. In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: Millennium Edition* text: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

The invention will also use search engines for searching. As described in the *Internet, Milleniun Edition* text, pages 395 and 522–535, search engines use keywords and phrases to query the Web for desired subject matter. Usually the keywords may be combined with some of the basic Boolean operators: AND, OR and NOT in designing Web queries. Each search engine has its own well developed syntax or rules for combining such Boolean operators with the keywords to conduct the searches. The search engine is a database application that retrieves information according to its own syntax. The search engine usually uses a search agent, called a "spider" that looks for information on Web pages. Such information is indexed and stored in a vast database. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo.

Figure 2:
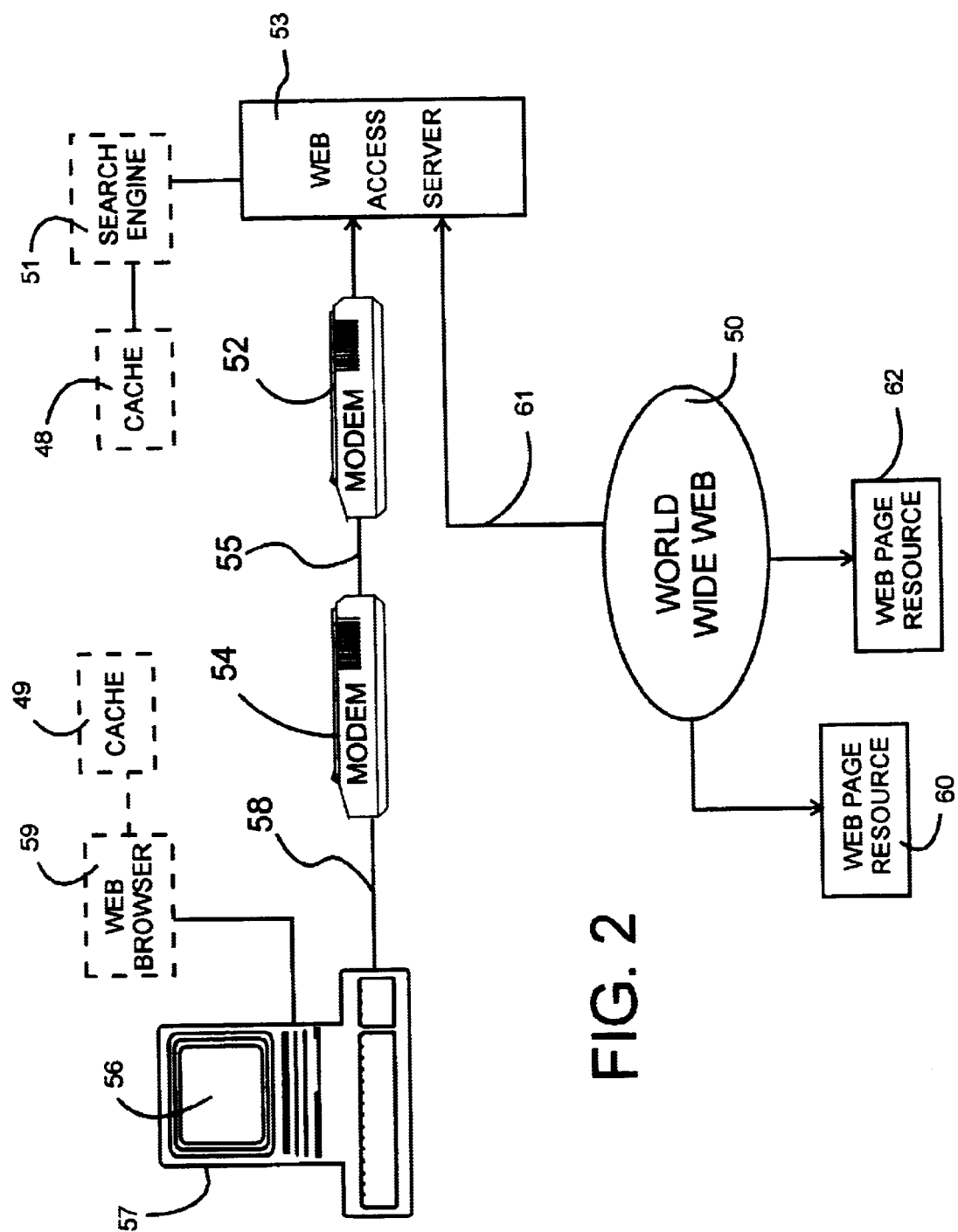
FIG. 2 is a generalized diagrammatic view of a Web portion showing how the Web may be accessed to and from the Web stations for the requesting Web pages and for tracking and precluding previously activated hyperlinks to Web pages.

A generalized diagram of a portion of the Internet, which the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56, which is one of a sequence of Web pages containing embedded hyperlinks to other Web pages.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 computer to control the communication with the Web access server 53 to thereby download and display the accessed Web pages 56 on terminal 57. The Web access server 53 uses one of the previously described search engines to access via the Web 50 and the desired sequence of Web pages from appropriate Web resources such as databases 60 and 62.

With this setup, the present invention, which will be subsequently described in greater detail with respect to FIGS. 3 and 4, may be carried out using cache 48 associated with search engine 51 in FIG. 2. As search engine 51 accesses the sequence of Web pages and provides such pages to the user at terminal 57, the overall search system may operate in one of two major modes selectable by the user. The system may track and discount all hyperlinks in mall documents provided to the user irrespective of whether the user selects or activates such links to obtain a linked document. Thus, once a hyperlink in a search or session is presented to a user, it will never be presented in any subsequent document. Alternately, the user may choose that only the hyperlinks in the pages that have been activated to access a linked document will be precluded from subsequent pages presented to the user, in which case he will not need to subsequently activate them again. Thus, the searching is progressive (i.e. hyperlinks activated by, or at least presented to, the user in previous Web documents are precluded from subsequent documents). The progressive searching advantages as set forth above are readily embodied and practiced at the search engine level as described above.

However, individualized searching of hypertext Web documents, as well as the caching and tracking of presented hyperlinks over a variety of combined searches, may be more readily applied to specific user needs if the caching and tracking of the hyperlinks is done at the browser level, through browser 59 and cache 49. The above cross-referenced copending Patent Application: A SYSTEM FOR PRECLUDING REPETITIVE ACCESSING OF WEB PAGES IN A SEQUENCE OF LINKED WEB PAGES ACCESSED FROM THE WORLD WIDE WEB THROUGH A WEB BROWSER AT A WEB RECEIVING DISPLAY STATION, sets forth such a browser directed system.

Figure 3:
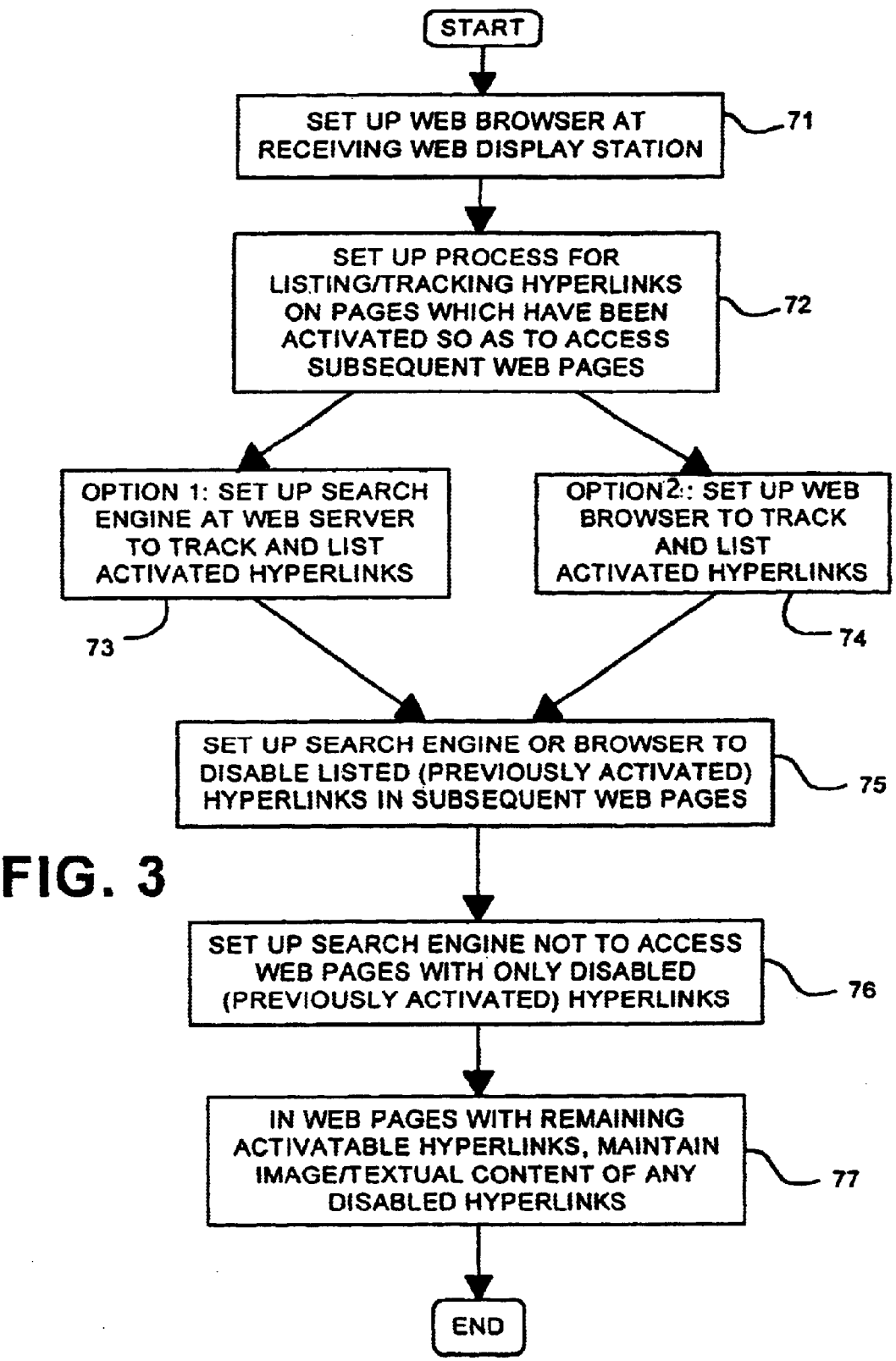
FIG. 3 is an illustrative flowchart describing the setting up of the elements needed for the program for precluding repetitive accessing of documents linked to hyperlinks in a plurality of hypertext documents.
Figure 4:
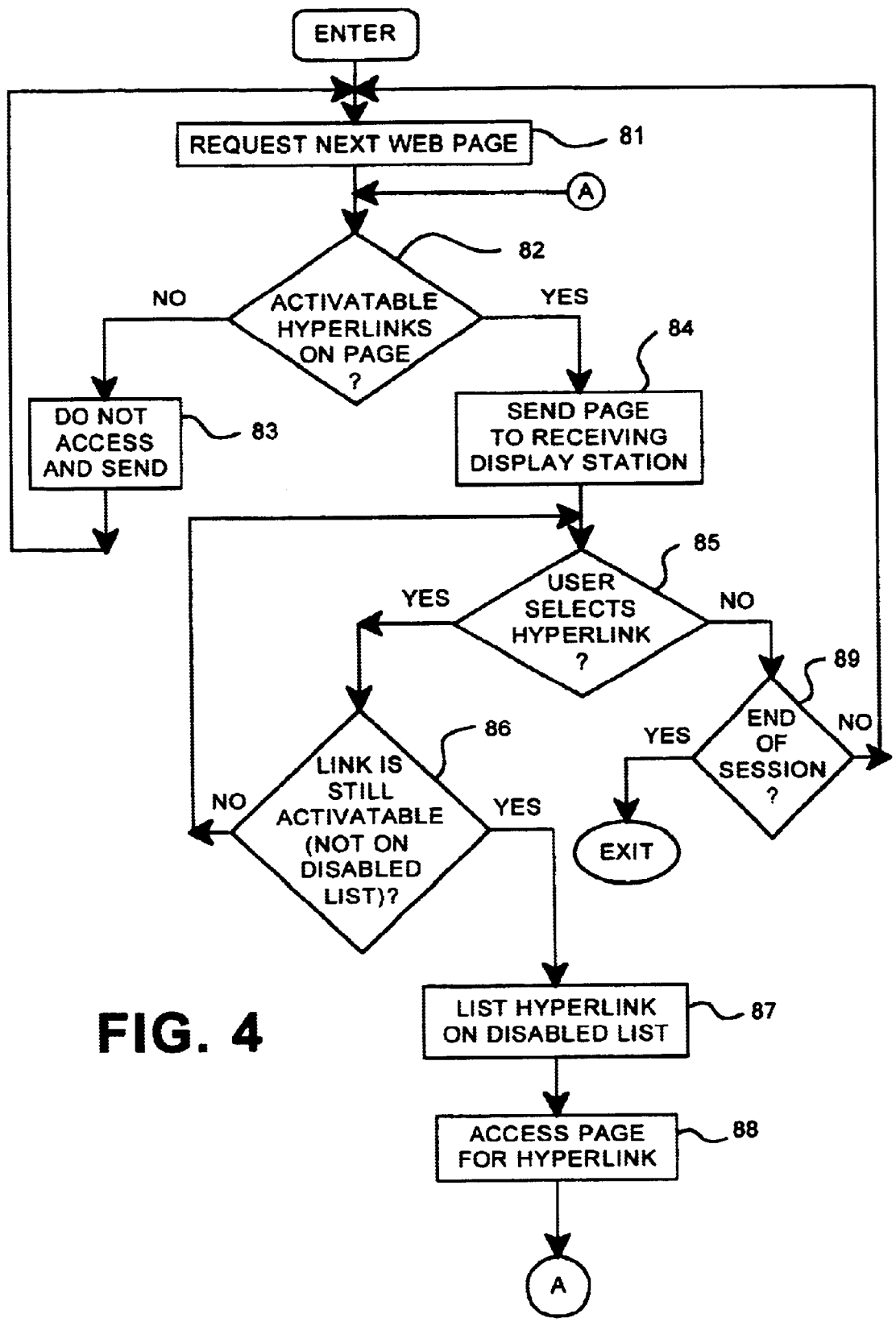
FIG. 4 is a flowchart of an illustrative run of the program set up in FIG. 3.

FIG. 3 is a flowchart showing the development of a process according to the present invention for precluding the accessing of documents linked to hyperlinks in a plurality of hypertext documents. Most of the programming functions in the process of FIG. 3 have already been generally described with respect to FIG. 2. A Web browser is provided at a receiving display station on the Web for accessing Web pages in the conventional manner and loading them at the display station, step 71; these Web pages will function as requesting Web pages for the searching of the Web to be subsequently described. Step 72, a process is provided for the tracking of hyperlinks on Web pages, as such hyperlinks are presented and/or activated by the user to access their linked Web page. These hyperlinks may optionally be tracked in two ways: (1) step 73, the first approach would be to set up the search engine to track and list only those hyperlinks which have actually been selected or activated in the Web pages presented to the user; or (2) step 74, the search engine may be setup to track and list every hyperlink in every page presented to the user irrespective of whether the user has activated the hyperlink. In such a situation, hyperlinks present on an earlier page are precluded from subsequent pages.

With either approach, step 75, the process is setup to operate to compare the hyperlinks in the accessed Web pages and to disable the hyperlinks listed as previously selected or discounted, step 75. In the present description, the term discounted is used to cover all hyperlinks which are to be precluded from subsequent pages, whether the hyperlink was precluded under the option of step 73 or the alternative option of step 74. Thus, when the subsequent Web page is displayed, all listed, i.e. discounted, hyperlinks will be disabled, i.e. precluded. Conventionally on Web pages, the hyperlink has some feature such as color or highlighting to indicate that it is a hyperlink. Thus, when it becomes disabled the color or highlight is removed and the content becomes undistinguished from the text or image content of the page. In addition, and particularly at the search engine option for tracking, if the next page has no activatable or selectable hyperlinks (all disabled), the whole Web page may be omitted, step 77, from the search sequence of Web pages according to the setup of step 76.

The running of the process setup in FIG. 3 and described in connection with FIG. 2 will now be described with respect to the flowchart of FIG. 4. Let us assume that we are in a search or browse session. The flowchart represents some steps in a routine which will illustrate the operation of the invention. The next Web page is requested, step 81. A determination is made as to whether there are any activatable links on the page, step 82. If No, the page is not even accessed, step 83, at the search engine level or not downloaded at the browser, dependent upon where previously activated or discounted hyperlinks are being tracked, and the process is returned to step 81 where the next Web page is awaited. If the decision from step 82 is Yes, there are still activatable hyperlinks. Then, step 84, the page is downloaded into the receiving station. A determination is made then as to whether the user has selected a hyperlink, step 85. If the decision is No, then a further determination is made as to whether the session is at an end, step 89. If Yes, the session is exited. If No, then the process is returned to step 81 where the next Web page is awaited. Decision step 86 is included to indicate that the user will not be permitted to select hyperlinks which are on the disabled list maintained by the process either at the search engine or at the browser. Usually, the Web page provided to the user through the search engine browser will already have eliminated any indications that the disabled hyperlinks may be selected as previously described. However, in a rudimentary embodiment, the process may be setup to advise the user No, either that the hyperlink has previously been accessed or it is not available to the user; and the process is returned to step 85 where the user may select another hyperlink in the page. On the other hand, if the determination from step 86 is Yes, the link is activatable, then the hyperlink is then listed on the disabled list, step 87, where it may be tracked as described and the linked page is then accessed, step 88, and downloaded into the reveiving display station.

One of the preferred implementations of the present invention is in application programs 40 made up of programming steps or instructions resident in RAM 14, FIG. 1, on a Web station during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, a system for precluding repetitive accessing of documents linked to hyperlinks in a plurality of hypertext documents comprising:

means at a receiving display station for activating hyperlinks to linked documents, means responsive to said activating means for accessing said linked documents, user interactive means for discounting hyperlinks in received Web documents, means for keeping track of each discounted hyperlink in each received or accessed document, and means for precluding the accessing of any document linked to a previously discounted hyperlink in a subsequently accessed another Web document not previously received.

2. The system of claim 1 wherein said means for discounting hyperlinks discount each hyperlink activated to access a Web document.

3. The system of claim 1, wherein:

said previously discounted hyperlinks are part of the text or image content of said subsequently accessed document, and said accessing of linked documents is precluded by rendering said previously discounted hyperlinks inactivatable in said subsequently accessed documents without affecting the text or image value of said hyperlinks.

4. The system of claim 3 further including means for precluding said subsequent accessing of any linked hypertext documents having only discounted hyperlinks.

5. The system of claim 4 further including:

a World Wide Web search engine, and wherein said means for keeping track and said means for precluding the accessing of documents linked to previously discounted hyperlinks and for precluding said subsequent documents having only precluded hyperlinks are in said search engine.

6. The system of claim 1 further including:

a World Wide Web search engine, and wherein said means for keeping track and said means for precluding are in said search engine.

7. In a World Wide Web communication network with user access via a plurality of data processor controlled interactive receiving display stations for displaying received hypertext documents including a sequence of at least one display page containing text, images and a plurality of embedded hyperlinks, each hyperlink being user selectable to access and display a respective linked hypertext document, a method for precluding repetitive accessing of documents linked to hyperlinks in a plurality of hypertext documents comprising:

activating at a receiving display station, hyperlinks to linked documents, in a received hypertext document, accessing said linked documents responsive to said activating, discounting hyperlinks in received Web documents, keeping track of each discounted hyperlink in each accessed linked document, and precluding the accessing of any document linked to a previously discounted hyperlink in a subsequently accessed another Web document not previously received.

8. The method of claim 7, wherein said discounting step discounts each hyperlink activated to access a Web document.

9. The method of claim 7, wherein:

said previously discounted hyperlinks are part of the text or image content of said subsequently accessed document, and said accessing of linked documents is precluded by rendering said previously discounted hyperlinks inactivatable in said subsequently accessed documents without affecting the text or image value of said hyperlinks.

10. The method of claim 9 further including the step of precluding said subsequent accessing of any linked hypertext documents having only precluded hyperlinks.

11. The method of claim 7 further including:

a World Wide Web search method, said steps of keeping track and precluding being in said search method.

12. The method of claim 11 further including:

a World Wide Web search method, said steps of keeping track, precluding the accessing of documents linked to previously discounted hyperlinks and precluding said subsequent documents having only precluded hyperlinks being in said search method.

13. A computer program having code recorded on a computer readable medium for precluding repetitive accessing of documents linked to hyperlinks in a plurality of hypertext documents in a World Wide Web communication network with user access via a plurality of data processor controlled interactive receiving display stations for displaying received hypertext documents including a sequence of at least one display page containing text, images and a plurality of embedded hyperlinks, each hyperlink being user selectable to access and display a respective linked hypertext document, said program comprising:

means at a receiving display station for activating hyperlinks to linked documents, means responsive to said activating means for accessing said linked documents, user interactive means for discounting hyperlinks in received Web documents, means for keeping track of each discounted hyperlink in each received or accessed document, and means for precluding the accessing of any document linked to a previously discounted hyperlink in a subsequently accessed another Web document not previously received.

14. The computer program of claim 13 wherein said means for discounting hyperlinks discount each hyperlink activated to access a Web document.

15. The computer program of claim 13, wherein:

said previously discounted hyperlinks are part of the text or image content of said subsequently accessed document, and said accessing of linked documents is precluded by rendering said previously discounted hyperlinks inactivatable in said subsequently accessed documents without affecting the text or image value of said hyperlinks.

16. The computer program of claim 15 further including means for precluding said subsequent accessing of any linked hypertext documents having only discounted hyperlinks.

17. The computer program of claim 16 further including:

a World Wide Web search program, and wherein said means for keeping track, said means for precluding the accessing of documents linked to previously discounted hyperlinks and said means for precluding said subsequent documents having only precluded hyperlinks are in said search program.

18. The computer program of claim 13 further including:

a World Wide Web search program, and wherein said means for keeping track and said means for precluding are in said search program.

19. A Web communication network comprising:

a receiving display station, means for displaying accessed received Web documents having hyperlinks to other Web documents at said display station, means for discounting hyperlinks in a received Web document, and means for precluding said discounted hyperlinks in any Web documents received subsequent to said received Web document.

20. The Web network of claim 19 wherein said means for discounting hyperlinks discount each hyperlink in said received Web document activated to access another Web document.

21. The Web network of claim 19 wherein said means for discounting hyperlinks discount all hyperlinks in said received Web document.

22. The Web network of claim 19 wherein said means for discounting hyperlinks discount only hyperlinks in said received Web document selected to be discounted.

23. In a Web communication network, a method for discounting hyperlinks comprising:

displaying a received Web document having hyperlinks to other Web documents, discounting hyperlinks in said received Web document, and precluding said discounted hyperlinks in any Web documents received subsequent to said received Web document.

24. The method of claim 23 wherein each hyperlink in said received Web document activated to access another Web document is discounted.

25. The method of claim 23 wherein all hyperlinks in said received Web document are discounted.

26. The method of claim 23 wherein only hyperlinks in said received Web document selected to be discounted are discounted.

27. A computer program having code recorded on a computer readable medium for precluding repetitive accessing of documents linked to hyperlinks in a plurality of hypertext documents in a Web communication network comprising:

means at a Web station for displaying received Web documents having hyperlinks to other Web documents, means for discounting hyperlinks in a received Web document, and means for precluding said discounted hyperlinks in any Web documents received subsequent to said received Web document.

28. The computer program of claim 27 wherein said means for discounting hyperlinks discount each hyperlink in said received Web document activated to access another Web document.

29. The computer program of claim 27 wherein said means for discounting hyperlinks discount all hyperlinks in said received Web document.

30. The computer program of claim 27 wherein said means for discounting hyperlinks discount only hyperlinks in said received Web document selected to be discounted.

* * * * *